(12) United States Patent
Eckert

(10) Patent No.: US 9,855,963 B2
(45) Date of Patent: Jan. 2, 2018

(54) HAND POWERED VEHICLE

(71) Applicant: Radio Flyer Inc., Chicago, IL (US)

(72) Inventor: Cameron Eckert, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 14/471,763

(22) Filed: Aug. 28, 2014

(65) Prior Publication Data

US 2015/0061256 A1 Mar. 5, 2015

Related U.S. Application Data

(60) Provisional application No. 61/871,757, filed on Aug. 29, 2013.

(51) Int. Cl.
| | |
|---|---|
| *B62B 3/12* | (2006.01) |
| *B62B 5/06* | (2006.01) |
| *A61G 5/02* | (2006.01) |
| *B62M 1/14* | (2006.01) |
| *B62K 5/05* | (2013.01) |
| *B62B 15/00* | (2006.01) |

(52) U.S. Cl.
CPC .............. *B62B 3/12* (2013.01); *A61G 5/022* (2013.01); *A61G 5/026* (2013.01); *B62B 5/06* (2013.01); *B62K 5/05* (2013.01); *B62M 1/14* (2013.01); *B62B 15/008* (2013.01)

(58) Field of Classification Search
CPC .................................... B62B 3/12; B62B 3/06
USPC ....................................................... 280/211
See application file for complete search history.

(56) References Cited

U.S. PATENT DOCUMENTS

| | | | | |
|---|---|---|---|---|
| 3,450,416 | A | * | 6/1969 | Mulder .................... B62K 9/02 280/211 |
| 3,712,397 | A | * | 1/1973 | Smith et al. .................. 180/6.2 |
| 3,820,790 | A | | 6/1974 | Peterson |
| 4,066,273 | A | | 1/1978 | Lohr |
| 4,077,647 | A | * | 3/1978 | Nagayama ............... B62M 1/14 280/211 |
| 4,506,901 | A | | 3/1985 | Tosti |

(Continued)

OTHER PUBLICATIONS

International Search Report for related International Patent Application No. PCT/US2014/053221 dated Dec. 17, 2014.

(Continued)

*Primary Examiner* — Jacob D Knutson
*Assistant Examiner* — Felicia L. Brittman
(74) *Attorney, Agent, or Firm* — McDermott Will & Emery LLP

(57) ABSTRACT

A hand-powered vehicle is provided for transportation and entertainment purposes. The vehicle has a frame supporting a pair of side wheels that are driven by the user. The frame includes a front portion and a pair of side portions extending rearwardly to the side wheels. The side portions of the frame do not extend rearwardly past the side wheels. The user sits on a seat that is supported by a portion of the frame extending rearwardly from the front portion and between the two side wheels. A third wheel is provided under or behind the seat, and that wheel is preferably a caster that is coupled to the frame at an angle to a vertical axis. The side wheels have hand grips extending therefrom, and the hand-powered vehicle is configured to be propelled by a user applying a force through the hand grips to rotate the side wheels.

18 Claims, 6 Drawing Sheets

(56) References Cited

U.S. PATENT DOCUMENTS

| | | | |
|---|---|---|---|
| 4,655,470 A | 4/1987 | Lin | |
| D296,774 S | 7/1988 | Armstrong | |
| 5,037,120 A | 8/1991 | Parisi | |
| 5,639,105 A | 6/1997 | Summo | |
| 6,276,703 B1 | 8/2001 | Caldwell | |
| 6,361,058 B1 * | 3/2002 | Yuan | B62K 9/00 280/242.1 |
| D465,439 S | 11/2002 | Van De Vrie | |
| 6,557,879 B2 | 5/2003 | Caldwell | |
| D486,760 S | 2/2004 | Devinast | |
| D498,709 S | 11/2004 | Sramek | |
| 6,902,177 B2 * | 6/2005 | Lindsay | A61G 5/023 280/282 |
| 6,910,701 B1 | 6/2005 | Long et al. | |
| D608,250 S | 1/2010 | Van De Vrie | |
| D626,038 S | 10/2010 | Li | |
| D653,996 S | 2/2012 | Webster | |
| D678,130 S | 3/2013 | Webster | |
| 8,496,261 B2 | 7/2013 | Adams et al. | |
| 2014/0217694 A1 | 8/2014 | Fitzwater et al. | |

OTHER PUBLICATIONS

Special Needs Playground Equipment—Whirl-O-Wheel, Catalog (online), MD Materials Playground. 2007 (retrieved on Apr. 11, 2014). Retrieved from the internet: <URL: http://www.specialneedsplaygroundequipment.com/handpropelledtrikes.html>.
Scooters for Children: Junior Whirly Wheel. Catalog (online). 2011 (retrieved on May 11, 2014). Retrieved from the internet: <URL: http://electric.scootersforchildren.com/2011/06/28/scooters-for-children-junior-whirly-wheel/>.

* cited by examiner

HAND POWERED VEHICLE

CROSS-REFERENCE TO RELATED APPLICATIONSA

This application claims the benefit of U.S. Provisional Patent Application No. 61/871,757, filed Aug. 29, 2013, which is incorporated herein by reference in its entirety and made a part hereof.

FEDERALLY SPONSORED RESEARCH OR DEVELOPMENT

Not Applicable.

TECHNICAL FIELD

The present disclosure generally relates to a ride-on vehicle. In particular, a hand-powered ride-on vehicle is provided with a rear wheel and two side wheels with hand grips to allow propulsion of the vehicle by hand.

BACKGROUND OF THE INVENTION

Ride-on vehicles are well known in the art. Traditionally, ride-on vehicles have four wheels and are powered by foot power or a separate power source. Alternative ride-on vehicles have less than four wheels and may be powered by alternate means, such as by hand. Such ride-on vehicles generally have a frame that extends around the entire periphery of the vehicle, including the seat. Additionally, the wheels of such ride-on vehicles are connected to shafts that are either generally perpendicular or generally horizontal to the frame. While such ride-on vehicles according to the prior art provide a number of advantages, they nevertheless have certain limitations. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY

According to one embodiment, the disclosed subject technology relates to a hand-powered vehicle provided for transportation and entertainment purposes. In one embodiment the vehicle has a frame supporting a pair of side wheels that are driven or operated by the user. The frame includes a forward or front portion and a pair of side portions extending rearwardly to the side wheels. The side portions of the frame do not extend rearwardly past the side wheels. The user sits on a seat that is supported by a portion of the frame extending rearwardly from the front portion and between the two side wheels. A third wheel is provided under or behind the seat, and that wheel is preferably a caster that is coupled to the frame with a shaft that is provided at an angle to a vertical axis, where the angle is neither 0° nor 90°. The side wheels have hand grips extending therefrom, and the hand-powered vehicle is configured to be propelled by a user applying a force through the hand grips to rotate the side wheels.

The disclosed subject technology further relates to a hand-powered vehicle, comprising a frame, a first side wheel, a second side wheel, a first hand grip, a second hand grip, a seat, and a rear wheel. The frame includes a front or forward portion, a first side portion extending rearwardly from a first end of the front portion, a second side portion extending rearwardly from a second end of the front portion, and a seat support extending rearwardly from the front portion between the first side portion and the second side portion. The first side wheel is rotatably coupled to the first side portion of the frame and there is a first hand grip that is coupled to the first side wheel. The second side wheel is rotatably coupled to the second side portion of the frame and there is a second hand grip that is coupled to the second side wheel. Preferably, the hand grips extend out generally horizontally or perpendicularly from the respective side wheels. The rear wheel is a rotatable rear wheel rotationally coupled at an angle to the seat support. The hand-powered vehicle is configured to be propelled by a user applying a force through the hand grips to rotate the first and second side wheels.

The disclosed subject technology further relates to a hand-powered vehicle where the first side portion of the frame does not extend rearwardly past the first side wheel, and where the second side portion of the frame does not extend rearwardly past the second side wheel.

The disclosed subject technology further relates to a hand-powered vehicle having a first axle extending from the first side portion of the frame, and wherein the first side wheel is rotatably coupled to the first axle, and a second axle extending from the second side portion of the frame, and wherein the second side wheel is rotatably coupled to the second axle. In one embodiment the first and second side portions of the frame are provided exterior of the first and second side wheels.

The disclosed subject technology further relates to a hand-powered vehicle where the first hand grip is rotatably coupled to the first side wheel, and the second hand grip is rotatably coupled to the second side wheel.

The disclosed subject technology further relates to a hand-powered vehicle where the rear wheel is mounted to the frame at an angle to a vertical axis of between 5° and 45°. According to another embodiment, the rear wheel is mounted to the frame at an angle to a vertical axis of between 10° and 15°.

The disclosed subject technology further relates to a hand-powered vehicle where there is no wheel directly supporting the front portion of the frame.

The disclosed subject technology further relates to a hand-powered vehicle where the seat support extends rearwardly from the front portion of the frame and has a first side seat support and a second side seat support. The first and second side seat supports are joined adjacent the seat. According to another embodiment, the seat comprises a seat base and a seat back.

The disclosed subject technology further relates to a hand-powered vehicle having a footrest coupled to the front portion of the frame. According to another embodiment, a skid plate may be coupled to one of a bottom portion of the front portion of the frame and the footrest.

The disclosed subject technology further relates to a hand-powered vehicle, comprising a frame including a front or forward portion, a first side portion extending rearwardly from a first end of the front portion to a first side wheel, a second side portion extending rearwardly from a second end of the front portion to a second wheel, and a seat support extending rearwardly from the front portion between the first side portion and the second side portion. The first side wheel is rotatably coupled to the first side portion of the frame and the first side portion of the frame does not extend rearwardly past the first side wheel. Similarly, the second side wheel is rotatably coupled to the second side portion of the frame and the second side portion of the frame does not extend rearwardly past the second side wheel. A first hand grip is coupled to the first side wheel, and a second hand grip is coupled to the second side wheel. A seat is coupled to the seat support, and there is a rotatable rear wheel rotationally coupled to the seat support distal the front portion of the frame. There is no wheel directly supporting the front portion of the frame. The hand-powered vehicle is configured to be propelled by a user applying a force through the hand grips to rotate the first and second side wheels.

The disclosed subject technology further relates to a hand-powered vehicle, comprising a tubular frame including a front or forward portion, a first side portion extending rearwardly from a first end of the front portion to a first side wheel, a second side portion extending rearwardly from a second end of the front portion to a second wheel, and a seat support extending rearwardly from the front portion between the first side portion and the second side portion. A first axle is connected to the first side portion of the frame and the first side wheel is rotatably coupled to the first axle. A first hand grip is also coupled to the first side wheel. A second axle is connected to the second side portion of the frame and the second side wheel is rotatably coupled to the second axle. A second hand grip is also coupled to the second side wheel. The first side portion of the frame does not extend rearwardly past the first side wheel, and the second side portion of the frame does not extend rearwardly past the second side wheel. A seat is coupled to the seat support, and there is a rotatable rear wheel rotationally coupled at an angle to the seat support distal the front portion of the frame, where the angle is neither 0° nor 90°. There is no wheel directly supporting the front portion of the frame. The hand-powered vehicle is configured to be propelled by a user applying a force through the hand grips to rotate the first and second side wheels.

The disclosed subject technology further relates to a hand-powered vehicle where the seat support extends rearwardly past the seat, and where the rear wheel is coupled to the seat support rearward of the seat.

The disclosed subject technology further relates to a hand-powered vehicle where the seat support is removably coupled to the front portion of the frame.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

DETAILED DESCRIPTION

Figure 1:
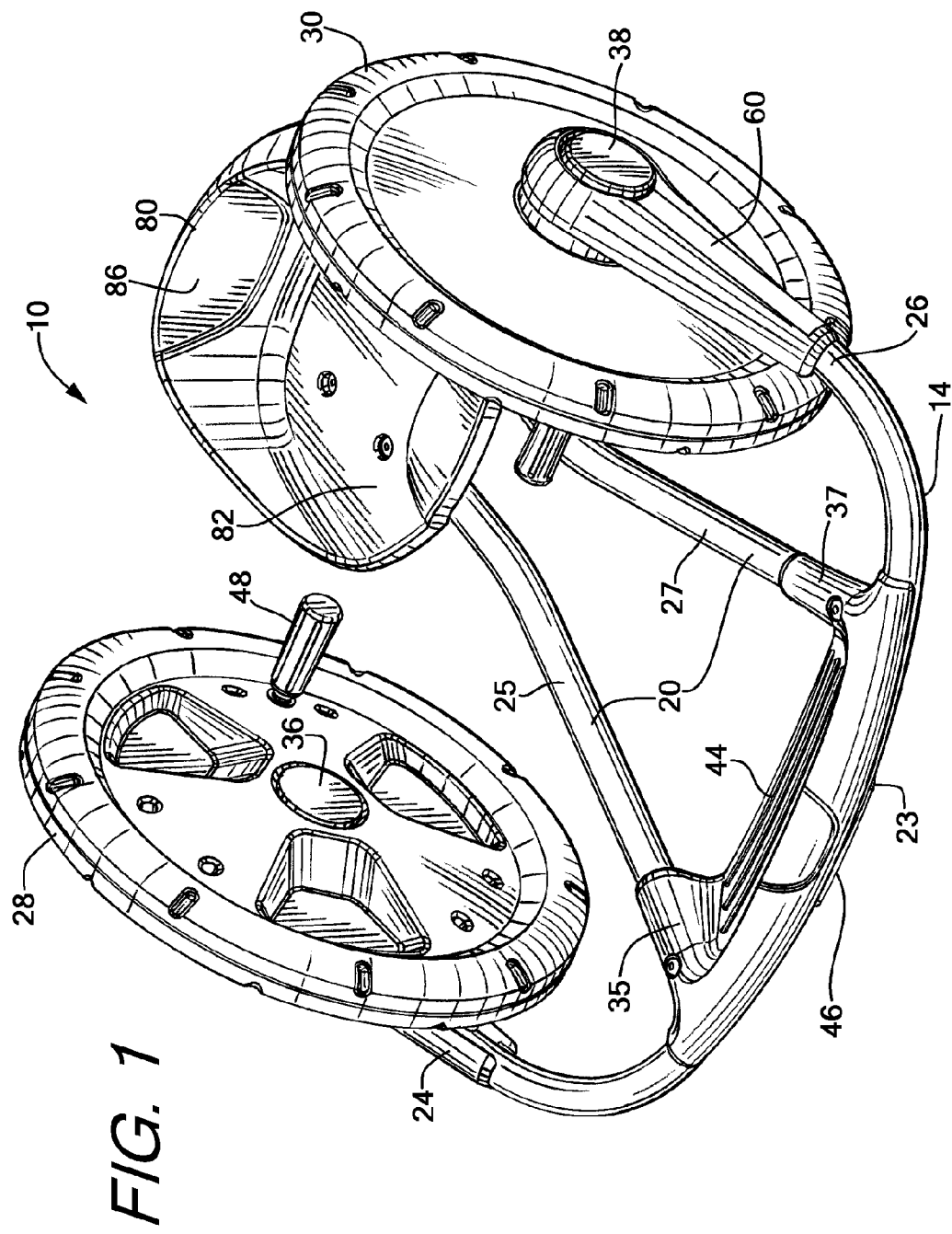
FIG. 1 is a front perspective view of a hand-powered vehicle according to one embodiment.
Figure 2:
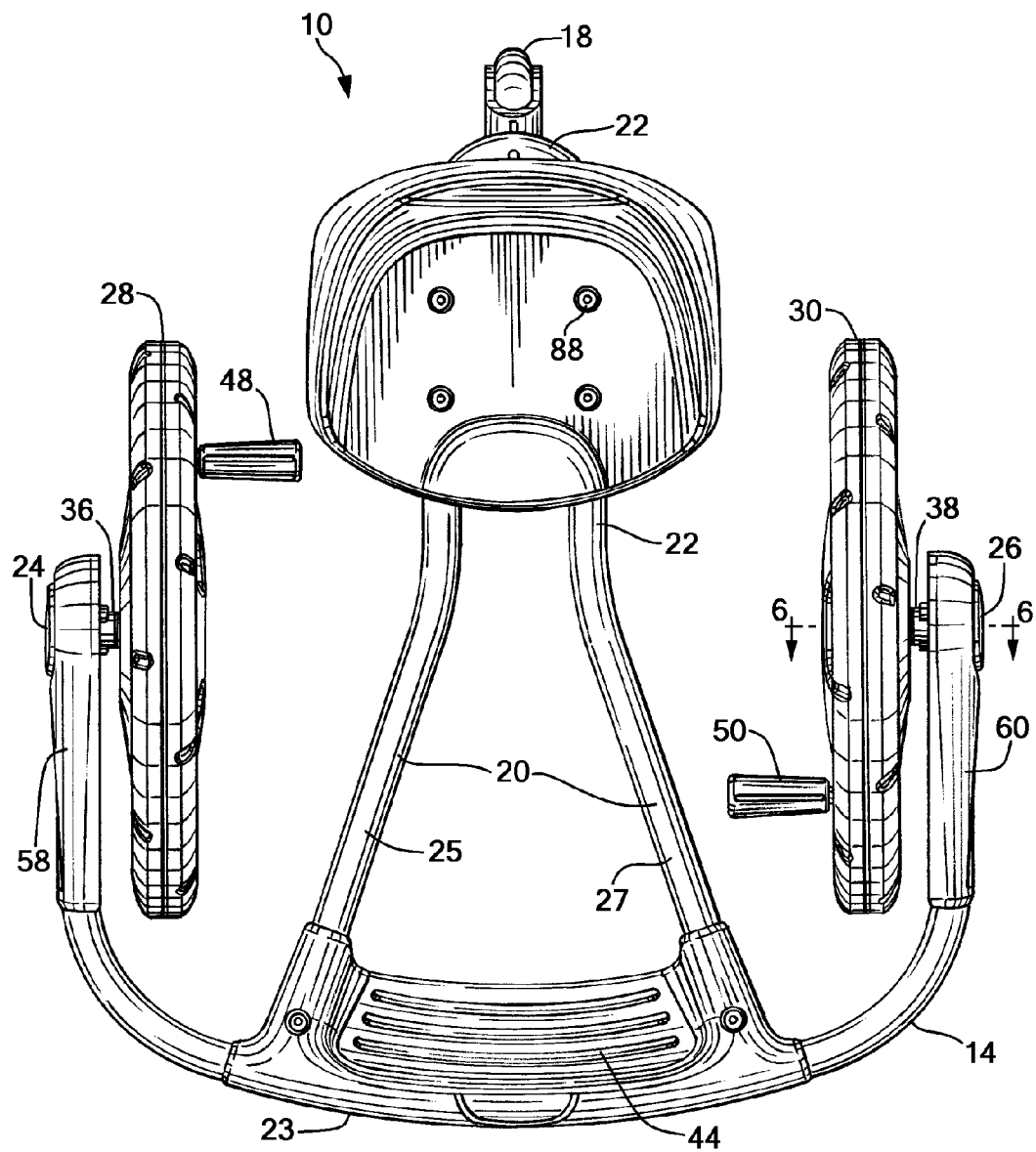
FIG. 2 is a top plan view of the hand-powered vehicle of FIG. 1.

While the hand-powered vehicle discussed herein is susceptible of embodiments in many different forms, there is shown in the drawings, and will herein be described in detail, preferred embodiments with the understanding that the present description is to be considered as an exemplification of the principles of the hand-powered vehicle and are not intended to limit the broad aspects of the disclosure to the embodiments illustrated.

The hand-powered vehicle is a product that can be used by children, adolescents and adults. For example, the hand-powered vehicle can be provided in one size only. Alternatively, the hand-powered vehicle can be provided in a range of sizes to accommodate different size riders (e.g., different age groups). In yet another alternative, the hand-powered vehicle can be provided with an adjustable frame to allow for changing the size of the hand-powered vehicle.

Referring now to FIGS. 1-6, in one embodiment the hand-powered vehicle 10 includes a frame 14 supported by a rear wheel 18 and first and second side wheels 28, 30. The frame 14 has a front portion 23, a first side portion 24, a second side portion 26 and a seat support 20 or seat portion 20. The rear wheel 18 generally supports the seat portion 20 of the frame 14, and first and second side wheels 28, 30 generally support the first and second side portions 24, 26 of the frame 14. The side portions 24, 26 of the frame 14 may also be referred to herein as end portions 24, 26 or arms 24, 26. Preferably, the first side wheel 28 is rotatably supported by the first side portion 24 of the frame 14 by a first axle 36, and the second side wheel 30 is rotatably supported by the second side portion 26 of the frame 14 by a second axle 38. In one embodiment the first and second axles 36, 38 are fixedly connected to the first and second side portions or arms 24, 26, respectively. Additionally, in one embodiment, depending on the size of the hand-powered vehicle, the side wheels 28, 30 are positioned approximately centrally between the rear wheel 18 and the front portion 23 of the frame 14. First and second wheel shields 58, 60 may by coupled to first and second side portions 24, 26 to provide protection and aesthetic appeal.

Figure 3:
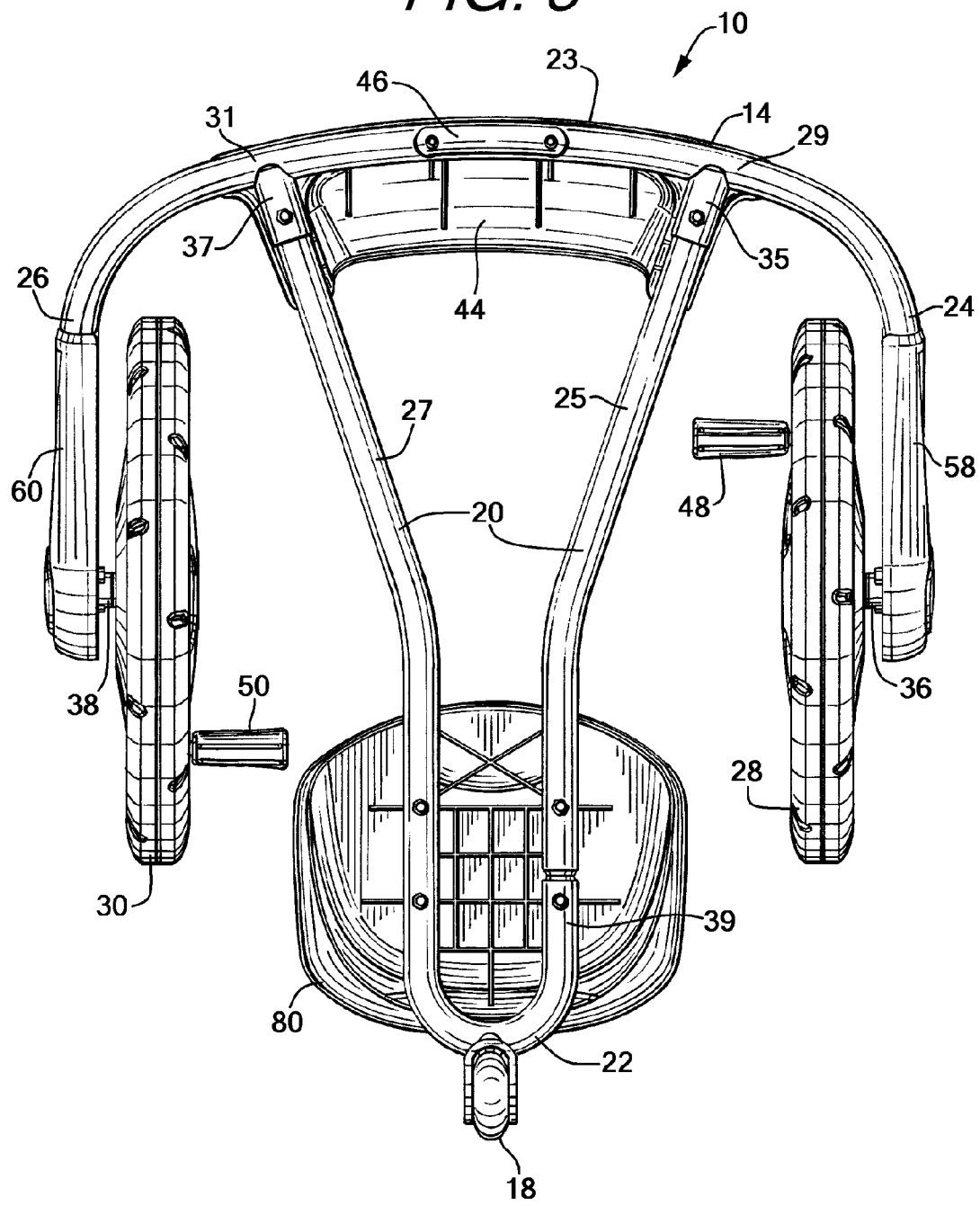
FIG. 3 is a bottom view of the hand-powered vehicle of FIG. 1.

Frame 14 is preferably an open configuration with first and second side portions 24, 26 and the front portion 23 forming a semi-circular or arcuate frame with no frame members extending from the first and second side wheels 28, 30 to the rear of the hand-powered vehicle 10. Referring to FIG. 3, the front portion 23 of the frame 14 has a first end 29 and a second end 31, although the ends may merely refer to reference locations, not a physical end. The first side portion 24 extends rearwardly from the first end 29 of the front portion 23, and the second side portion 26 extends rearwardly from the second end 31 of the front portion 23. Additionally, in a preferred embodiment the first side portion 24 of the frame 14 does not extend rearwardly past the first side wheel 28, and the second side portion 26 of the frame 14 does not extend rearwardly past the second side wheel 30.

In such an embodiment only one frame member connects from the front of the frame 14 to each respective side wheel 28, 30, and the frame does not extend rearwardly from the respective side wheel 28, 30 directly to the rear portion 22 of the frame 14. In this configuration the first and second side wheels 28, 30 are cantilevered from the front of the frame 14. Additionally, in this embodiment the seat portion 20 of the frame 14 is not connected directly to the side wheels 28, 30. Finally, in this configuration there is no wheel directly supporting the front portion 23 of the frame 14. Rather, the front portion 23 of the frame 14 is supported indirectly via the side wheels 28, 30 and rear wheel 18.

Frame 14 further includes the seat portion 20 or seat support 20 extending rearwardly from the front portion 23 of the frame 14, between the first side portion 24 and the second side portion 26. The seat portion 20 generally comprises a central frame portion and a rear portion 22. The central frame portion generally connects the rear portion 22 to front portion 23. In a preferred embodiment the central frame portion comprises first and second central frame portions 25, 27, also referred to as first and second side seat supports 25, 27, however, only one central frame portion may be utilized or the first and second central frame portions may be combined. In such an embodiment the first central frame portion 25 is connected to front portion 23 at the first end 29 of the front portion 23 adjacent the first side portion 24, and the second central frame portion 27 is connected to the front portion 23 at the second end 31 of the front portion 23 adjacent the second side portion 26.

As best shown in FIG. 3, front portion 23 includes first and second receivers 35, 37 configured to receive ends of the first and second central portions 25, 27. Preferably, first and second receivers 35, 37 are welded to front portion 23. Alternatively first and second receivers 35, 37 may be integrally formed with front portion 23 or attached to front portion 23 by fasteners and the like. Preferably, first and second central portions 25, 27 and rearward portion 22 form a U-shaped configuration of the seat support 20 with rearward portion 22 being integrally formed with one of the central portions, such as the second central portion 27. In such an embodiment, the first and second side seat supports are joined adjacent the seat, and preferably extend rearward of the seat. In one embodiment, the second central portion 27 and rearward portion 22 combination includes a third receiver 39 configured to receive an end of the first central portion 25. Alternatively, any combination of rearward portion 22, front portion 23, first and second central portions 25, 27, and first and second side portions 24, 26 may be integrally formed as part of frame 14. In a preferred embodiment the frame 14 is made of tubing, such as aluminum or steel structural tubing, however, alternate materials that provide sufficient rigidity and support may be utilized. Further, in a preferred embodiment the tubing is generally connected via a tube-in-tube configuration, with one tube portion having a female receiving end and the mating tube portion having a male mating end. Additionally, fasteners, such as screws or bolts, may secure the mating tube portions. For packaging purposes the connecting tube-in-tube configuration allows the vehicle 10 to be disassembled into a tight package configuration.

Figure 4:
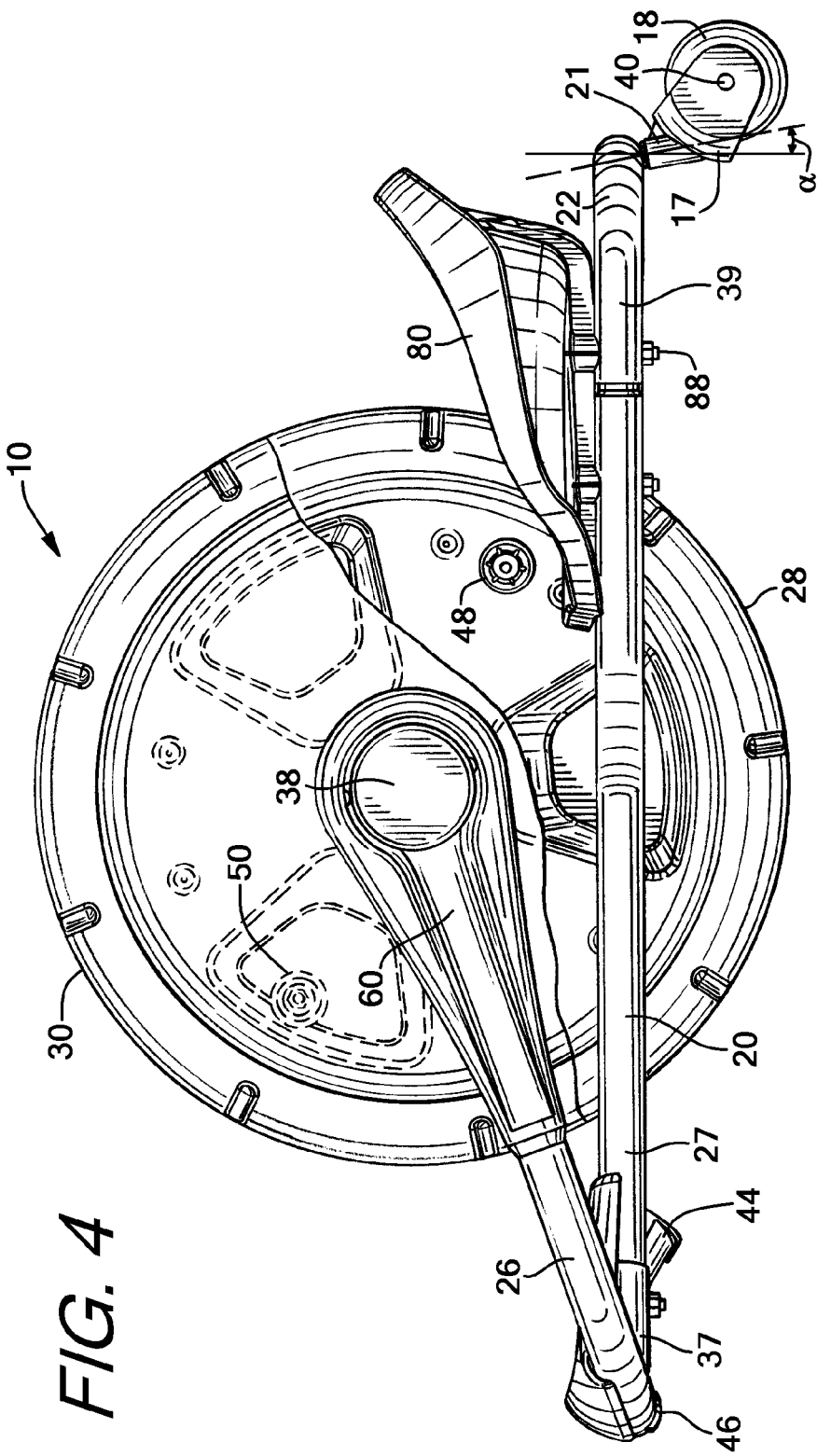
FIG. 4 is a side view of the hand-powered vehicle of FIG. 1, including a partial cut-away through one of the side wheels.
Figure 5:
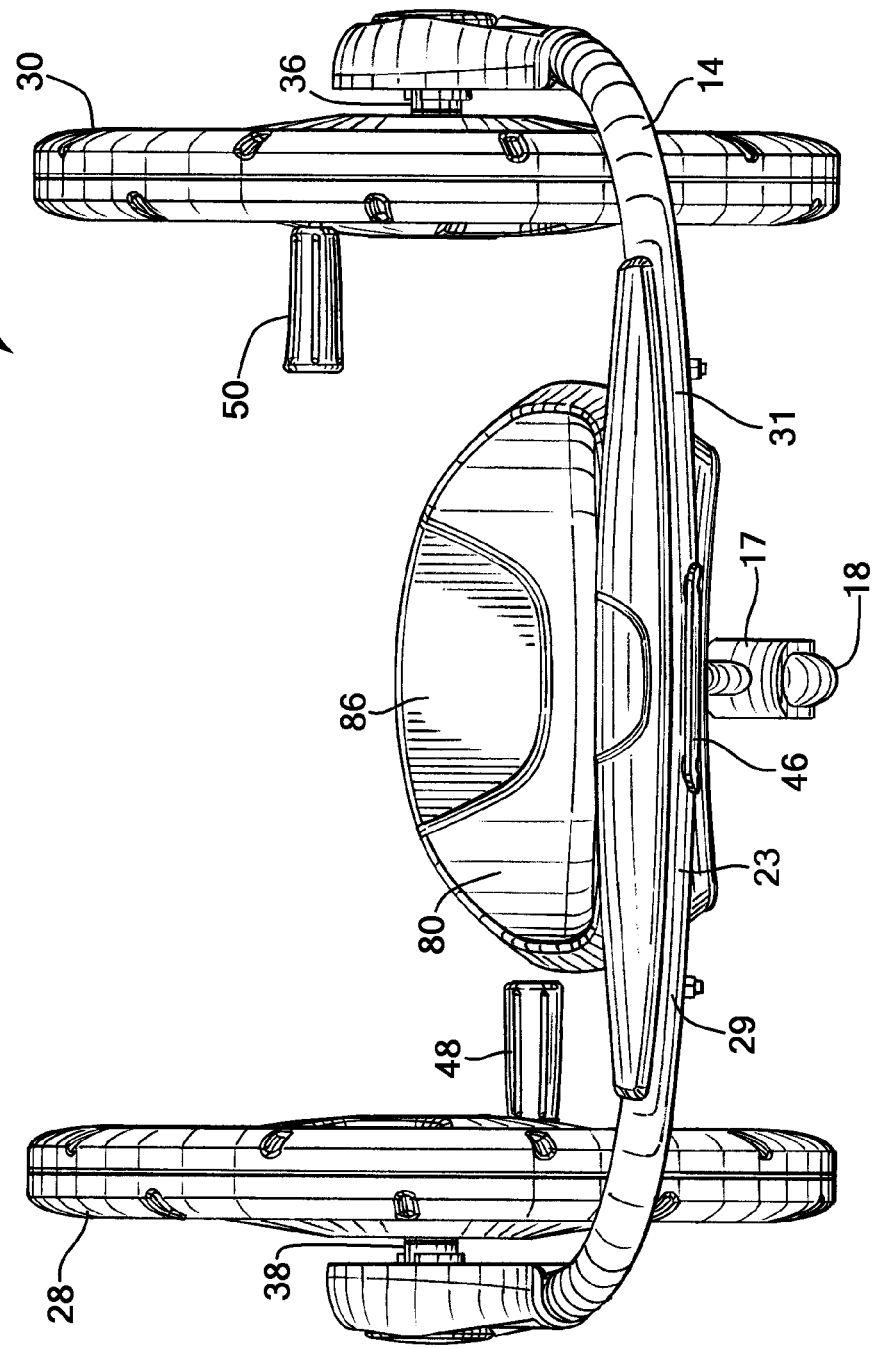
FIG. 5 is a front elevation view of the hand-powered vehicle of FIG. 1.
Figure 6:
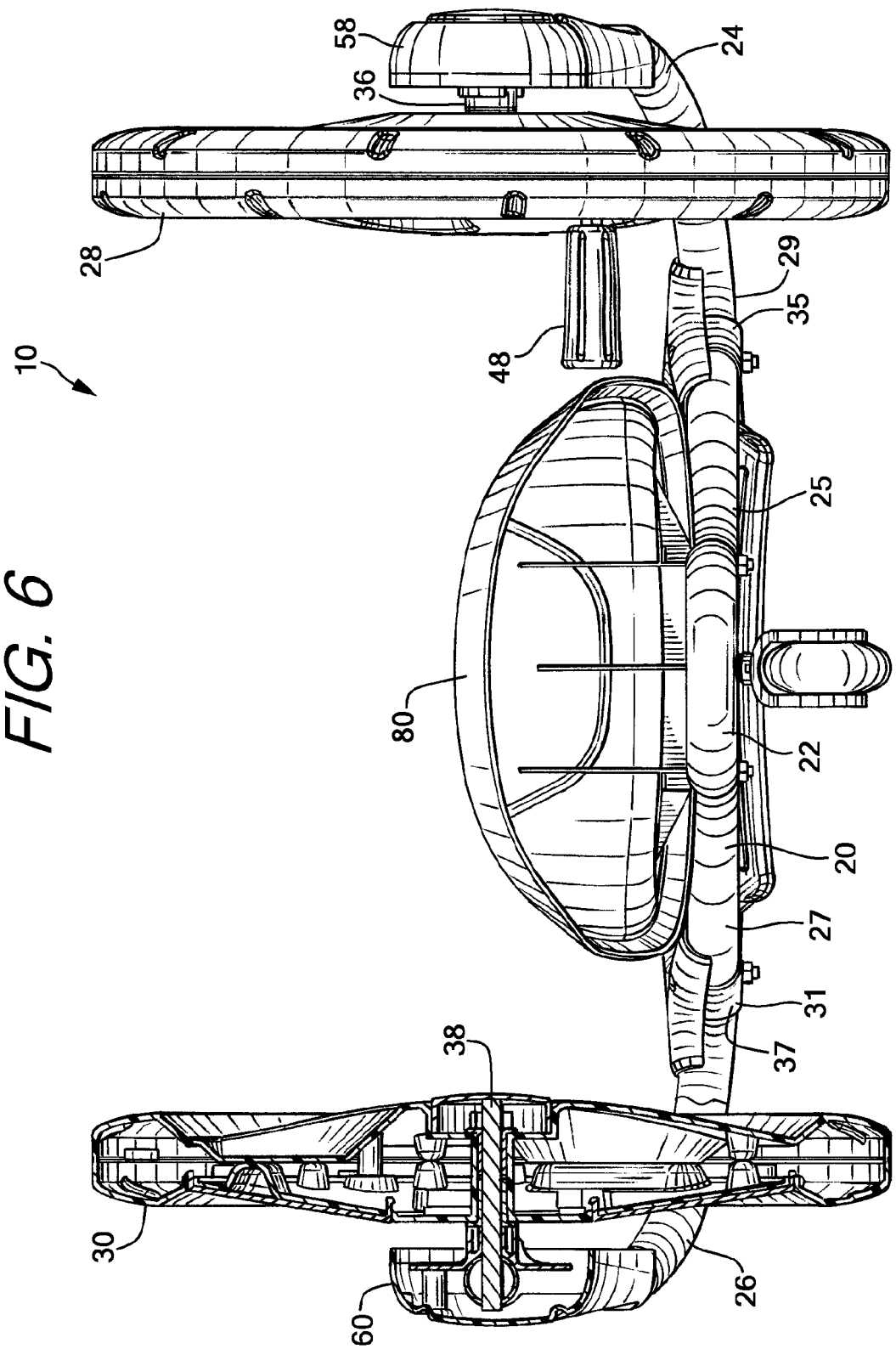
FIG. 6 is a rear view of the hand-powered vehicle of FIG. 1, including a cross-section of one of the side wheels about line 6-6 in FIG. 2.

Referring to FIG. 6, the first side wheel 28 is rotatably coupled to the first side portion 24 of the frame 14, and the second side wheel 30 is rotatably coupled to the second side portion 62 of the frame 14. In a preferred embodiment, a first axle 36 is connected to and extends from the first side portion 24 of the frame 14. Similarly, a second axle 38 is connected to and extends from the second side portion 26 of the frame 14. The first side wheel 28 is rotatably coupled to the first axle 36, and the second side wheel 30 is rotatably coupled to the second axle 38. Preferably, the first side wheel 28 freely spins or rotates on the first axle 36 and the second side wheel 30 freely spins or rotates on the second axle 38. In a preferred embodiment the first side wheel 28 and the second side wheel 30 are drive wheels and have a larger diameter than the rear wheel 18. In one embodiment the first and second side wheels 28, 30 have a diameter of approximately 16 inches. Conversely, in one embodiment the rear wheel 18 has a diameter of approximately 2.5 inches. Referring to FIG. 4, the first and second side portions 24, 26 of the frame 14 extend upwardly at an angle from the front portion 23 of the frame 14 to the side wheels 28, 30. The angle of the first and second side portions 24, 26 in combination with the caster wheel 18 size and connection of the caster wheel 18 to the frame 14 has been designed so that the seat portion 20 of the frame 14 is preferably horizontal to a ground. In one embodiment the seat portion 20 of the frame is approximately 3 inches above the ground in the normal position.

As shown in FIGS. 1-6, in one embodiment a seat 80 is coupled to the rearward portion 22 of the seat support 20 of the frame 14. In one embodiment, the seat 80 includes a seat base 82 and a seat back 86 that are integrally formed. Alternatively the seat 80 may be formed only of a seat base, or a separate seat base and seat back that are attached together or mounted separately, for example. Seat 80 may be fastened to the rearward portion 22 of the seat support 20 of the frame 14 by any suitable fasteners 88, such as bolts, screws, nuts, rivets and the like.

A footrest 44 is provided and is preferably coupled to the front portion 23 of the frame 14. In one embodiment the footrest 44 comprises a plastic component that joins an area between the first and second central portions 25, 27 and which also connects over the front portion 23. A skid plate 46 is preferably coupled to the bottom of the front portion 23 of the frame 14 or to the bottom of the footrest 44 to provide increased durability of the frame 14. In a preferred embodiment the footrest 44 is connected to frame 14 by bolts, screws, rivets and the like, and the skid plate 46 is fixedly connected to the footrest 44. Alternatively, either or both footrest 44 and skid plate 46 can be integrally formed with frame 14. Additionally, the skid plate 46 may be integrally formed with the footrest 44.

As shown in FIG. 4, the rear wheel 18 is rotationally coupled at an angle to the seat support 20, and preferably distal the front portion 23 of the frame 14. The rear wheel 18 has a wheel housing 17 that is rotationally coupled to the frame 14 so that the wheel housing 17, and associated rear wheel 18, can preferably spin a full 360° about a shaft 21 connecting the rear wheel housing 17 to the seat support 20. Additionally, the rear wheel 18 is rotationally supported by a third axle 40 coupled to a wheel housing 17 to allow the rear wheel 18 to rotate about the third axle 40 during propulsion of the hand-powered vehicle 10. The rear wheel housing 17, and thus the rear wheel 18 as well, is rotatably coupled to the rearward portion 22 of the frame 14 via the caster housing shaft 21 to enable stable support of the hand-powered vehicle 10. The rear wheel 18 is preferably a caster mounted at an angle to the seat support 20 of the frame 14, via shaft 21. The angle at which the shaft 21 of the wheel housing 17 is coupled to the frame 14 is generally an angle between 5° and 45° taken with respect to a vertical axis. One benefit of coupling the rear wheel 18 at an angle to the frame 14 is to prevent chatter of the rear wheel 18. Another benefit of coupling the rear wheel 18 at an angle to the frame 14 is to assist in maintaining the vehicle 10 moving in a straight line when force is provide by the user to propel the vehicle 10. The greater the angle to the vertical at which the rear wheel 18 is provided, the greater the assistance is provided by the rear wheel 18 to maintain the vehicle 10 moving straight during propulsion. However, the greater the angle to the vertical at which the rear wheel 18 is provided, the more difficult it is to rotate the rear wheel about the wheel shaft 21 to allow for turning and spinning of the vehicle 10. Accordingly, a balance must be met between assisting in maintaining the vehicle moving in a straight line and allowing for quick turning and spinning of the vehicle 10. Accordingly, one preferred range for the angle (α), shown in FIG. 4, of the shaft 21 for the wheel housing 17 with respect to a vertical axis is between 10° and 15°.

First and second hand grips 48, 50 are preferably coupled to the first and second side wheels 28, 30 respectively. The hand grips 48, 50 are preferably positioned outwardly from the center of the wheels 28, 30 and most preferably toward an outer circumference of each wheel 28, 30. The hand grips 48, 50 are preferably rotatably coupled to the wheels 28, 20 so that the hand grips 48, 50 can rotate with respect to the wheels 28, 30. In this configuration a rider can hold the handles 28, 30 and rotate the wheels 28, 30 without having to let go of the hand grips 48, 50.

To ride the hand-driven vehicle 10, a rider sits in seat 80, places their feet on footrest 44 and grips first and second hand grips 48, 50 with their hands. Combinations of pushing and/or pulling on the first and second hand grips 48, 50 to rotate the wheels 28, 30 (i.e., applying a force to the first and second wheels 28, 30 through the hand grips 48, 50) allows the hand-powered vehicle 10 to move in any desired direction.

Several alternative examples have been described and illustrated herein. A person of ordinary skill in the art would appreciate the features of the individual embodiments, and the possible combinations and variations of the components. A person of ordinary skill in the art would further appreciate that any of the examples could be provided in any combination with the other examples disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the word "including" as used herein is utilized in an open-ended manner.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A hand-powered vehicle, comprising:
    a frame including a front portion, a first side portion extending rearwardly from a first end of the front portion, a second side portion extending rearwardly from a second end of the front portion, and a seat support extending rearwardly from the front portion between the first side portion and the second side portion, wherein the seat support extending rearwardly from the front portion comprises a first side seat support connected to the front portion and a second side seat support connected to the front portion;
    a first side wheel rotatably coupled to the first side portion;
    a first hand grip coupled to the first side wheel;
    a second side wheel rotatably coupled to the second side portion;
    a second hand grip coupled to the second side wheel;
    a seat directly connected to the first side seat support and directly connected to the second side seat support coupled to the seat support, wherein the first side seat support is positioned a first distance from the second side seat support at a location adjacent the seat, wherein the first side seat support is positioned a second distance from the second side seat support at a location adjacent the front portion of the frame, and wherein the second distance is greater than the first distance to allow for a user's feet to be situated between the first side seat support and the second side seat support adjacent the front portion of the frame;
    a substantially planar foot support directly connected to the front portion of the frame, the first side seat support and the second side seat support;
    a rotatable rear wheel having a wheel housing that is rotationally coupled to the seat support and,
    wherein the hand-powered vehicle is configured to be propelled by the user applying a force through the hand grips to rotate the first and second side wheels.

2. The hand-powered vehicle of claim 1, wherein the rear wheel is mounted to the frame at an angle to a vertical axis of between 10° and 15°.

3. The hand-powered vehicle of claim 1, wherein the seat comprises a seat base and a seat back.

4. The hand-powered vehicle of claim 1, wherein the first side portion of the frame does not extend rearwardly past the first side wheel, and wherein the second side portion of the frame does not extend rearwardly past the second side wheel.

5. The hand-powered vehicle of claim 1, wherein the first and second side seat supports are joined adjacent the seat.

6. The hand-powered vehicle of claim 1, further comprising a skid plate coupled to one of a bottom portion of the front portion of the frame and the footrest.

7. The hand-powered vehicle of claim 1, further comprising a first axle extending from the first side portion of the frame, and wherein the first side wheel is rotatably coupled to the first axle, and a second axle extending from the second side portion of the frame, and wherein the second side wheel is rotatably coupled to the second axle.

8. The hand-powered vehicle of claim 1, wherein the first hand grip is rotatably coupled to the first side wheel, and wherein the second hand grip is rotatably coupled to the second side wheel.

9. The hand-powered vehicle of claim 1, wherein the rear wheel is mounted to the frame at an angle to a vertical axis of between 5° and 45°.

10. The hand-powered vehicle of claim 1, wherein there is no wheel directly supporting the front portion of the frame.

11. A hand-powered vehicle, comprising:
    a frame including a front portion, a first side portion extending rearwardly from a first end of the front portion to a first side wheel, a second side portion extending rearwardly from a second end of the front portion to a second wheel, and a seat support extending rearwardly from the front portion between the first side portion and the second side portion;

a footrest directly connected to the front portion of the frame and to the seat support extending rearwardly from the front portion of the frame, the footrest having a substantially planar footrest surface extending between the seat support and the front portion of the frame at an angle from the front portion of the frame that is different from an angle at which the seat support extends from the front portion of the frame;

the first side wheel rotatably coupled to the first side portion, wherein the first side portion of the frame does not extend rearwardly past the first side wheel;

a first hand grip coupled to the first side wheel;

a second side wheel rotatably coupled to the second side portion, wherein the second side portion of the frame does not extend rearwardly past the second side wheel;

a second hand grip coupled to the second side wheel;

a seat coupled to the seat support;

a rotatable rear wheel rotationally coupled to the seat support distal the front portion; and, wherein the hand-powered vehicle is configured to be propelled by the user applying a force through the hand grips to rotate the first and second side wheels.

12. The hand-powered vehicle of claim 11, wherein the rear wheel is mounted to the seat support at an angle the vertical axis of between 10° and 15°.

13. The hand-powered vehicle of claim 11, wherein the seat support extending rearwardly from the front portion comprises a first side seat support and a second side seat support, and wherein the first and second side seat supports are joined adjacent the seat.

14. The hand-powered vehicle of claim 11, further comprising a first axle extending from the first side portion of the frame, and wherein the first side wheel is rotatably coupled to the first axle, and a second axle extending from the second side portion of the frame, and wherein the second side wheel is rotatably coupled to the second axle.

15. The hand-powered vehicle of claim 11, wherein there is no wheel directly supporting the front portion of the frame.

16. A hand-powered vehicle, comprising:

a tubular frame including a front portion, a first side portion extending rearwardly from a first end of the front portion to a first side wheel, a second side portion extending rearwardly from a second end of the front portion to a second side wheel, and a Y-shaped seat support extending rearwardly from the front portion between the first side portion and the second side portion, and wherein an opening of the Y-shaped seat support faces the front portion of the tubular frame;

a substantially planar foot support directly connected to the front portion of the tubular frame and directly connected to the Y-shaped seat support;

a first axle connected to the first side portion and the first side wheel rotatably coupled to the first axle, wherein the first side portion of the frame does not extend rearwardly past the first side wheel;

a first hand grip coupled to the first side wheel;

a second axle connected to the second side portion and the second side wheel rotatably coupled to the second side portion, wherein the second side portion of the frame does not extend rearwardly past the second side wheel;

a second hand grip coupled to the second side wheel;

a seat coupled to the seat support, wherein there is no wheel directly supporting the front portion of the frame;

a rotatable rear wheel rotationally coupled to the seat support distal the front portion; and, wherein the hand-powered vehicle is configured to be propelled by a user applying a force through the hand grips to rotate the first and second side wheels.

17. The hand-powered vehicle of claim 16, wherein the seat support extends rearwardly past the seat, and wherein the rear wheel is coupled to the seat support rearward of the seat.

18. The hand-powered vehicle of claim 16, wherein the seat support is removably coupled to the front portion of the frame.

* * * * *